Patented Aug. 12, 1952

2,606,892

UNITED STATES PATENT OFFICE 2,606,892

POLYMERIZABLE AND POLYMERIZED ISOCYANATE COMPOSITIONS

Edward L. Kropa, Old Greenwich, and Arthur S. Nyquist, Cos Cob, Conn., assignors to American Cyanamid Company, New York, N. Y., a corporation of Maine No Drawing. Application August 30, 1946, Serial No. 694,156

22 Claims. (Cl. 260—80.3)

This invention relates to new and useful compositions of matter and more particularly to polymerizable and polymerized isocyanate compositions.

Still more particularly, the invention is concerned with polymerizable compositions comprising a mixture of (1) a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ has a value which is one of the following: 0, 1, the methylene radical attached to the isocyanate grouping being attached directly, when $n$ is 1, to any carbon atom of the divalent radical represented by A, and (2) a different organic compound which is copolymerizable with the isocyanate of (1), which contains a single

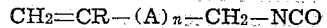

grouping and which is free from a hydrogen atom or atoms reactive with the isocyanate grouping, the proportions of the said ingredients of (1) and (2) in the said mixture being such that the resulting polymerization product has an average of at least two isocyanate groupings per molecule; and with the products of polymerization of the said polymerizable composition.

Illustrative examples of divalent radicals that A in the aforementioned general formula for the primary isocyanate may represent are: ethylene, propylene (trimethylene), butylene, isobutylene, pentylene, isopentylene, hexylene, and other divalent saturated aliphatic hydrocarbon radicals, including divalent saturated cycloaliphatic hydrocarbon radicals, e. g., cyclopentylene, cyclohexylene, cycloheptylene, etc.; phenylene, naphthylene, biphenylene, and other divalent aromatic hydrocarbon radicals; 2,4-tolylene, xylylene, ethyl 2,5-phenylene, propyl 2,4-phenylene, isopropyl 3,4-phenylene, 1-butyl 2,4-naphthylene and other divalent saturated aliphatic-substituted aromatic hydrocarbon radicals; phenylethylene, phenylpropylene, phenylbutylene, naphthylethylene, naphthylisobutylene, and other divalent aromatic-substituted saturated aliphatic hydrocarbon radicals; as well as radicals that may be classed either as divalent saturated aliphatic-substituted aromatic or divalent aromatic-substituted saturated aliphatic hydrocarbon radicals, e. g., 4,alpha-tolylene, 3,beta-phenyleneethyl 4,alpha-xylylene, 2-gamma-phenylenebutyl, etc.

It is an object of the present invention to prepare new copolymers. Another object of the invention is to prepare liquid compositions which are especially valuable in treating textile materials, e. g., cotton, wool, rayon, etc., to impart improved properties thereto. Another object of the invention is to prepare coating, laminating, and molding compositions and molded articles utilizing new copolymers. For example, the copolymer may be used as a binder for a filler or in pretreating fillers, e. g., alpha-cellulose, wood flour, etc., prior to incorporation in a molding composition. Other objects will be apparent to those skilled in the art as the description of the invention proceeds.

It was suggested prior to our invention that copolymers of a 1-alkenyl isocyanate, e. g., vinyl isocyanate, with a vinyl or a vinylidene compound, specifically vinyl acetate, styrene and methyl methacrylate, might be prepared. It was also suggested that solutions of such copolymers be applied to fabrics in order to impart water repellency thereto. However, to the best of our knowledge and belief, it was not known heretofore that isocyanates of the kind represented by the general formula $CH_2=CR-(A)_n-CH_2-NCO$ where R, A, and $n$ have the meanings given in the second paragraph of this specification would yield, upon polymerization with a compound which is copolymerizable therewith, which contains a single

grouping and which is free from a hydrogen atom or atoms reactive with the isocyanate grouping (e. g., alcohols, acids, water, etc.), copolymer compositions which, when applied in solution or dispersed state to woolen goods and the like, have the particular and peculiar property of imparting shrinkage resistance thereto, and yet effecting this result with a smaller amount of treating agent than generally is required. For example, when a toluene solution of a soluble copolymer of allyl isocyanate and ethyl acrylate was applied to a piece of woolen goods and the treated goods was heated to evaporate the solvent and to insolubilize the copolymer, the treated cloth even after five launderings showed a shrinkage of only 3.3%. In marked contrast, untreated woolen cloth when similarly laundered for the same number of times showed a shrinkage of 44.5%. It was quite unexpected and unpredictable that isocyanate copolymer compositions of the kind described in the second paragraph of this specification would impart such outstanding shrinkage resistance to an organic fabric, specifically a woolen fabric. Even more surprising was the fact that this shrinkage resistance was imparted to the woolen goods without in any way lessening its softness to the touch, and that these results were obtained by impregnating the woolen fabric with only about 8 to 9% by weight of copolymer, since with most treating materials about 14 to 16% by weight of treating agent, based on the dry weight of the woolen goods, is required in order to impart satisfactory shrinkage resistance thereto.

The improved results obtained with the copolymer compositions of our invention are believed to be due to the fact that the linear molecules of the copolymer, which in all cases contains an average of at least two isocyanate groupings per molecule and may contain an average of as many as, for example, 200 or more isocyanate groupings per molecule, react with the fiber molecules of the wool to form another cross-linked polymer. This new product consists of two linear materials which are interwoven, namely, molecules of the wool fiber joined with molecules of resin. The "soft hand," that is, soft feeling to the touch, is believed to be due to flexible resin linkages between the wool molecules. Usually, when other materials are applied to wool in order to render it shrink-resistant, a harsh finish results due to the fibers of wool becoming drawn together. By using copolymers of the kind with which this invention is concerned in treating the wool, the rubber-like portion of the copolymer molecule, which portion is derived from the acrylic or other monomer copolymerized with the isocyanate, provides flexibility between the wool molecules with the result that the treated wool has a soft hand.

By employing isocyanate copolymer compositions of the kind hereinbefore described, it is possible to obtain better control of the shrinkage of, for example, wool than is possible by the use of conventional materials. Another advantage is that a lesser amount of treating material than generally is employed produces the desired results. For example, if it is desired to treat cotton or rayon in order to render it shrink-resistant, it is common practice to use approximately 2 to 4% of a conventional resinous material to effect this result. However, if the cotton or rayon material also is to be made crease-resistant, then ordinarily it requires about 8 to 10% of a conventional resin in order to impart this property to the material. In the case of wool, as much as about 16% of conventional treating material may be required in order to provide satisfactory shrinkage and crease control of the woolen fabric.

By using our isocyanate copolymer composition, outstanding shrinkage control and also crease control can be effected with the same amount of treating agent with obvious advantages. Furthermore, the same isocyanate copolymer may be applied to textile materials made either of cotton, rayon or wool, or may be applied to mixed fabric materials, for example, textiles made of rayon and cotton, rayon and wool, rayon and regenerated fibers (both cellulosic and protein) and the like. An additional advantage, as previously indicated, is that a lesser amount of treating agent is required as compared with conventional materials.

It is believed that these improved results are due to the fact that the isocyanate copolymers with which our invention is concerned contain an isocyanate grouping which is attached to a primary carbon atom. The attachment of the primary carbon atom appears to serve a two-fold function. First, it places the isocyanate grouping sterically off the main polymeric chain, putting it in a position more favorable for chemical reaction with any hydrogen-donor molecule; and secondly, the presence of an isocyanate grouping which is attached to a primary carbon atom renders such a grouping much more chemically reactive with hydrogen-donor materials.

The foregoing explanation is supported by other known facts. For instance, it is commonly known that a primary hydroxyl grouping reacts with a hydrogen-donor material many times faster than a hydroxyl grouping which is attached to a secondary carbon atom. Moreover, hydroxyl groups on tertiary carbon atoms are usually inactive under the same conditions. It also is generally known that almost any resinous material, when applied to a fabric, will impart some degree of finish to the fabric, but it is only in those cases where extensive and complete chemical reaction occurs between the resin and the fabric that one secures a satisfactory degree of both shrinkage and crease resistance.

The isocyanates used in practicing our invention may be prepared, for example, by three general methods: the first involves the reaction of the corresponding alkenyl halide with a metallic isocyanate; the second involves the metathesis of the corresponding alkenyl urea and an isocyanate, which latter may be mono- or poly-functional; while the third involves the reaction of the corresponding amine with phosgene and the dehydrohalogenation of the corresponding acid chloride thereby obtained.

Since all of the amines used in the preparation of these isocyanates are attached to a primary carbon atom they may be produced by the catalytic reduction of a suitable derivative of the corresponding nitrile. Inasmuch as the reduction of the nitrile to the amine would destroy the final unsaturation, it is necessary to protect this grouping during the reduction. This may be done, for example, by the reduction of the corresponding carbinol derivative of the nitrile and subsequent dehydration and reaction with phosgene. The resulting acid chloride is then dehydrohalogenated to yield the isocyanate.

Illustrative examples of primary isocyanates that may be used in practicing the present invention and which are embraced by the general formula $CH_2=CR-(A)_n-CH_2-NCO$, where R, A and $n$ have the meanings hereinbefore given, are listed below:

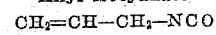
Allyl isocyanate
$CH_2=CH-CH_2-NCO$

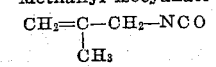
Methallyl isocyanate
$CH_2=C-CH_2-NCO$
      |
     $CH_3$

3-butenyl isocyanate
$CH_2=CH-CH_2-CH_2-NCO$

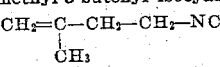
3-methyl-3-butenyl isocyanate
$CH_2=C-CH_2-CH_2-NCO$
      |
     $CH_3$

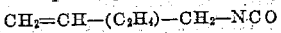
4-pentenyl isocyanates
$CH_2=CH-(C_2H_4)-CH_2-NCO$ 4-methyl-4-pentenyl isocyanates
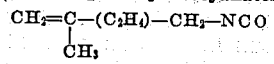

5-hexenyl isocyanates
$CH_2=CH-(C_3H_6)-CH_2-NCO$ 5-methyl-5-hexenyl isocyanates
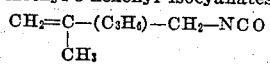

10-hendecenyl isocyanates
$CH_2=CH-(C_8H_{16})-CH_2-NCO$

Vinylbenzyl isocyanates
$CH_2=CH-(C_6H_4)-CH_2-NCO$

Isopropenylbenzyl isocyanates
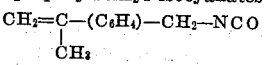

Vinylnaphthylmethyl isocyanates
$CH_2=CH-(C_{10}H_6)-CH_2-NCO$

Isopropenylnaphthylmethyl isocyanates
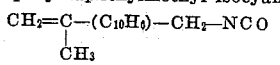

Vinylbiphenylylmethyl isocyanates
$CH_2=CH-(C_6H_4 \cdot C_6H_4)-CH_2-NCO$

Isopropenylbiphenylylmethyl isocyanates
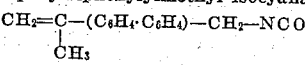

2-methyl-3-butenyl isocyanate
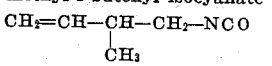

2,3-dimethyl-3-butenyl isocyanate
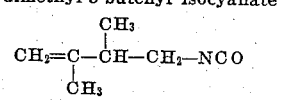

2-phenyl-3-butenyl isocyanate
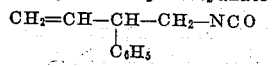

2-phenyl-3-methyl-3-butenyl isocyanate
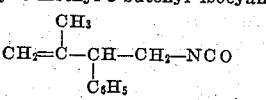

2-tolyl-3-butenyl isocyanate
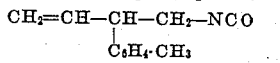

2-tolyl-3-methyl-3-butenyl isocyanate
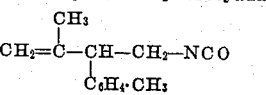

2-methyl-4-pentenyl isocyanate
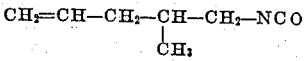

2-ethyl-4-methyl-4-pentenyl isocyanate
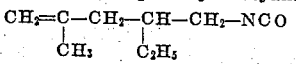

2-phenyl-4-pentenyl isocyanate
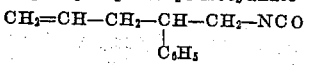

2-tolyl-4-methyl-4-pentenyl isocyanate
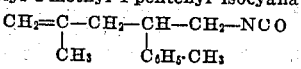

Allylbenzyl isocyanates
$CH_2=CH-(CH_2 \cdot C_6H_4)-CH_2-NCO$

Methallylbenzyl isocyanates
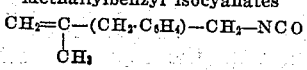

2-benzyl-3-butenyl isocyanate
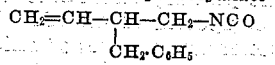

2-benzyl-4-methyl-4-pentenyl isocyanate
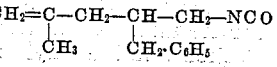

Vinylcyclopentylmethyl isocyanates
$CH_2=CH-(C_5H_8)-CH_2-NCO$

Isopropenylcyclohexylmethyl isocyanates
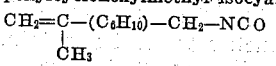

2,2-dimethyl-3-butenyl isocyanate
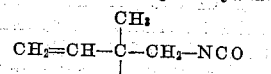

Illustrative examples of monomeric materials which may be copolymerized with the isocyanates hereinbefore described to produce the new copolymers of this invention are N,N-dialkyl acrylamides, e. g., N,N-dimethyl, -diethyl, -dipropyl, -dibutyl, -dipentyl, -dihexyl, -dioctyl, etc., acrylamides; N-methyl, N-ethyl acrylamide, N-ethyl, N-propyl acrylamide, etc.; the acrylic, α-alkyl acrylic and α-haloacrylic esters of saturated monohydric alcohols, for instance, saturated aliphatic monohydric alcohols, e. g., the methyl, ethyl, propyl, isopropyl, butyl, isobutyl, pentyl, etc., esters of acrylic, methacrylic, ethacrylic, propacrylic, chloroacrylic, bromoacrylic, etc., acids; the phenyl, benzyl, phenylethyl, etc., esters of the aforementioned acids; vinyl aromatic hydrocarbons, e. g., styrene, dimethyl styrene, dichloro styrene, cyanostyrene, vinyl naphthalene, etc.; the vinyl esters of saturated aliphatic monocarboxylic acids, e. g., vinyl acetate, vinyl propionate, vinyl butyrate, vinyl valerate, etc.; alkyl vinyl ketones, e. g., methyl vinyl ketone, ethyl vinyl ketone, methyl isopropenyl ketone, etc.; itaconic diesters containing a single

grouping, e. g., the dimethyl, diethyl, dipropyl, dibutyl and other saturated aliphatic monohydric alcohol diesters of itaconic acid, diphenyl itaconate, dibenzyl itaconate, di-(phenylethyl) itaconate, etc.; allyl and methallyl esters of saturated aliphatic monocarboxylic acids, e. g., allyl and methallyl acetates, allyl and methallyl propionates, allyl and methallyl valerates, etc.; nitriles containing a single

grouping, e. g., acrylonitrile, methacrylonitrile, etc. Mixtures of the aforementioned monomeric materials may be employed, if desired, as well as mixtures of such monomer or monomers with other copolymerizable materials containing a single

grouping. The material which is mixed and polymerized with the isocyanate in all cases should be copolymerizable with the isocyanate, should contain a single

grouping, but should not contain any hydrogen atom or atoms which will react with the isocyanate grouping.

The copolymers of this invention are prepared by mixing the primary isocyanate with a different organic compound of the kind hereinbefore described, numerous examples of which have previously been given. Examples of preferred classes of such compounds are the N,N-dialkyl acrylamides, the acrylic esters of saturated aliphatic monohydric alcohols and the vinyl esters of saturated aliphatic monocarboxylic acids. The copolymerizable materials are mixed in proportions such that the resulting copolymer has an average of at least two isocyanate groupings per molecule. Such a product is obtained when the mixture contains, by weight, for instance, from about 3 to 30% of the primary isocyanate, e. g., allyl isocyanate, methallyl isocyanate, etc., and from about 97 to 70% of the other copolymerizable monomer, e. g., N,N-dibutyl acrylamide, ethyl acrylate, vinyl acetate, etc.

The mixed ingredients are copolymerized under anhydrous conditions. Copolymerization may be effected, for example, under the influence of ultraviolet light, with or without heat and with or without a catalyst such, for instance, as benzoyl peroxide or other organic peroxide which is free from a hydrogen atom or atoms that would react with the isocyanate grouping. If desired, the mixed ingredients may be copolymerized in solution state, for instance, in solution in an inert organic solvent, e. g., toluene, benzene, xylene, dioxane, ethers (e. g., dibutyl ether), esters (e. g., butyl acetate), chlorobenzene, ethylene dichloride, ketones (e. g., methyl ethyl ketone), etc. The temperature of copolymerization may be varied as desired or as conditions may require, but ordinarily will be within the range of from about 20° to about 150° C. when copolymerization is effected in the absence of a solvent. When the mixed ingredients are copolymerized in solution state, then copolymerization generally is effected at the boiling temperature of the solution. In all cases, the temperature of copolymerization is below the decomposition temperature of the monomeric materials.

In copolymerizing the primary isocyanate with the other copolymerizable monomer we prefer to use heat and a catalyst which is free from hydrogen or other groups reactive with the isocyanate grouping, e. g., benzoyl peroxide, di-(tertiary-butyl) peroxide, acetyl peroxide, etc., since thereby we are better able to obtain soluble copolymers. When such a soluble copolymer is exposed to light, insolubilization occurs. This reaction appears to take place through the direct polymerization of the isocyanate grouping. It is possible to effect insolubilization by exposing the copolymer to the action of ultraviolet light or by long exposure to diffused daylight. When the copolymerization is conducted under conditions involving ultraviolet light and a peroxide, both soluble and partially soluble copolymers may be produced. By proper selection of the polymerization conditions it is possible to obtain, at will, soluble or insoluble materials. In order to preserve soluble copolymers which are suitable for reaction with hydrogen-donor materials it is preferable to store such copolymers or solutions of the same in the absence of light. On the other hand, it is possible to obtain an insoluble film of copolymer by exposing a film of the soluble copolymer to the action of ultraviolet light or, for a longer period, to the action of diffused light.

As pointed out hereinbefore, it is advisable during the copolymerization to avoid the use of any compounds which are capable of reacting with the isocyanate grouping, e. g., alcohols, acids, water, etc. In the case of the high molecular weight copolymers it has been found that after dissolving them in an organic liquid which is insoluble in water, it is possible to emulsify the organic solution of the copolymeric isocyanate. The presence of the organic liquid appears to act as a barrier to prevent water from coming into contact with the copolymeric isocyanate. In order further to impede the transfer of liquid water and water vapor, one can introduce into the initial solution a small amount of material which is known to impede the transfer of water vapor, e. g., for example, polyethylene, crystalline products such as paraffin, microcrystalline waxes, etc.

In order that those skilled in the art better may understand how the present invention may be carried into effect, the following examples are given by way of illustration and not by way of limitation. All parts are by weight.

*Example 1*

| | Parts |
|---|---|
| Ethyl acrylate | 45.0 |
| Allyl isocyanate | 5.0 |
| Benzoyl peroxide | 0.2 | were mixed together and placed in a quartz flask inclined and fitted with a 3-way adapter. A reflux condenser was attached to the vertical joint of the adapter and a gas delivery tube was attached to the adapter joint opposite from the flask. A slow stream of dry carbon dioxide was passed through the flask during the course of the reaction. The flask was irradiated from below, thus directly on the reaction mass, with a small laboratory size Mico ultra violet lamp, the lamp being mounted about 1½ inches from the flask.

Irradiation of the catalyzed mixture of monomers was continued for 162 hours. At the end of this time, the ethyl acrylate and allyl isocyanate had copolymerized to a clear mass which, although soft, had little tendency to flow.

When the polymeric mass was dissolved in dry toluene, most of it went into solution. However, part of the copolymer, although it swelled highly, did not dissolve. Apparently, a certain amount of cross-linking occurred during the polymerization reaction. When a small portion of the toluene solution was treated with a few drops of ethylene diamine, gelation occurred almost immediately. Similarly, when a small portion of the toluene solution was treated with p-phenylene diamine, although no reaction occurred immediately, warming on the steam bath for several minutes was sufficient to cause gelation. This illustrates the high degree of reactivity of the copolymer.

Twelve parts of the above solution which contained about 30%, by weight, of copolymer, was diluted with 68 parts of dry toluene to give 80 parts of a solution containing about 5%, by weight, of copolymer. Two pieces of cotton poplin were then treated directly with this solution. The pieces of fabric were immersed in the solution for about 10 to 15 seconds, squeezed out and allowed to air-dry until all the solvent had evaporated. One piece of the treated cloth was then heated in an oven at 120° C. for 4 minutes. The second piece of treated cloth was heated in an oven at 120° C. for 7 minutes. A third piece of the poplin, which had been pre-dried by heating in the oven at 100° C. for about 40 minutes, was also treated with the copolymer solution and, after air-drying, was given a heat treatment at 120° C. for 4 minutes.

When compared with a piece of untreated poplin, all three of the treated pieces were stiffer and were somewhat more crease-resistant than the untreated cloth. When compared for water repellency, all three pieces of treated cloth were definitely superior to the untreated cloth.

A piece of woolen goods was treated with a toluene solution containing about 10% by weight of the copolymer of this example. The wool sample (9″ x 23″ in size) was immersed in the solution, and passed through squeeze rolls to give 80–90% wet pick-up (8–9% solids). The sample was framed, air-dried for a short period, and then heated for 9 minutes at 290° F. After cooling to room temperature, the sample was removed from the frame, allowed to remain undisturbed for about 16 hours and was then measured prior to laundering. The method of laundering was a modification of the standard method of the A. A. T. C. C., and involved heating for 20 to 30 minutes at 240° F. while drying after each washing. After a cycle of 5 washing (10 minutes in soap solution) and drying operations, and a final washing of 1 hour in the soap solution, the dried treated cloth showed a shrinkage of only 3.9%. In marked contrast, untreated woolen cloth when similarly laundered for the same number of times showed a shrinkage of 44.5%. After 15 washing and drying cycles, the shrinkage was only 4.2%. The laundered cloth had a soft hand.

Cotton goods treated with the above 10% copolymer solution was found to have 100% retention to soaping and dry cleaning.

The copolymer of this example imparts a good degree of crease resistance to fabric materials, e. g., rayon. Thus, when a sample of rayon was treated with a 10% toluene solution of the copolymer, the treated rayon showed a crease-resistance value of 6.7, whereas the crease-resistance value of the untreated rayon was 5.1 (Tootal, Broadhurst and Lee standard method of determining crease resistance).

Similar results are obtained when methallyl isocyanate is substituted for allyl isocyanate in the above formula and the resulting copolymer is used as hereinbefore described.

Example 2

|                    | Parts |
|--------------------|-------|
| Butyl acrylate     | 90.0  |
| Allyl isocyanate   | 10.0  |
| Benzoyl peroxide   | 0.4   |
| Toluene (dry)      | 33.0  |

The toluene was placed in a flask and heated under reflux while maintaining a bath temperature of 130 to 135° C. The mixture of the other ingredients was added dropwise over a period of 23 minutes. Heating was continued under reflux for a period of 3 hours. One hundred parts of dry toluene was then added, after which about 115 parts of solvent was distilled off at reduced pressure on a steam bath in order to remove any unreacted monomers. The resulting material was diluted with 225 parts dry toluene, yielding a solution containing about 86.6 parts (approximately 38.5% by weight) of copolymer. When a small portion of this solution was treated with 2 to 3 drops of ethylene diamine, gelation occurred almost immediately upon stirring the mixture. One hundred and eighty-two (182) parts of the 38.5% solution was thinned with additional toluene to yield a solution containing about 10% by weight of copolymer. This solution was used in treating wool as described under Example 1. After a cycle of 5 washing and drying operations, and a final washing of 1 hour in the soap solution, the dried, treated piece of wool showed a shrinkage of 5.8%. After 15 washing and drying cycles, the shrinkage was 6.7%. The treated cloth had a soft hand.

Example 3

|                   | Parts |
|-------------------|-------|
| Butyl acrylate    | 90.0  |
| Allyl isocyanate  | 10.0  |
| Benzoyl peroxide  | 0.4   | were mixed together and subjected to ultraviolet light while the mixture was exposed to an atmosphere of carbon dioxide. After exposure for about 2 hours, an increase in the viscosity of the solution was noted. After 18 hours' exposure, the mixture was clear, very viscous but still flowed. After a total of 90 hours' exposure, during which time the flask occasionally was rotated so that a new surface was exposed to the light, a clear polymeric mass was obtained which had no appreciable flow when the flask was tipped. One hundred parts of dry toluene was mixed with the copolymer produced as above described and allowed to stand for about 3 days. Some of the copolymer dissolved in the toluene, but the greater part of it was in a highly swollen but insoluble gel state. This was apparently due to cross-linking brought about by the allyl isocyanate during the polymerization. The soluble portion of the material was decanted and the gel that remained was then twice extracted with additional toluene. This solution may be used in treating cotton, wool, rayon, silk, etc., to improve their properties.

Four pieces of muslin were impregnated 3 times with a toluene solution containing about 15% by weight of the above-described butyl acrylate-allyl isocyanate copolymer, the pieces being air-dried after each impregnation. The impregated sheets were superimposed, and laminated by heating between steel plates for 8 minutes at 125 to 130° C. under a pressure of approximately 50 pounds per square inch. A flexible, well-bonded laminated sheet was obtained. Cross-linking of the copolymer occurred during curing.

Example 4

Same formula as in the preceding example. Ultraviolet radiation was applied to the mixed ingredients in a quartz flask under anhydrous conditions using a small Mico ultraviolet lamp placed about 1½ inches from the flask. After 75 minutes' treatment, a slight but definite increase in viscosity was noted. After about 31 hours' total irradiation, 100 parts of dry toluene was added to the resulting copolymer, but the solid copolymer did not completely dissolve in the toluene even after standing for about 6 days. An additional 100 parts of dry toluene was now added and dissolution of the copolymer therein was hastened by shaking the container. An appreciable amount of highly swollen, gelled copolymer was present in the mass, but the amount thereof was considerably less than that resulting from the preceding example. The solution was strained to remove gel particles, and additional dry toluene was added to yield a solution containing about 20.8% by weight of copolymer. Three hundred parts of the resulting solution was transferred to a one-liter flask and part of the solvent was distilled off at reduced pressure to remove any unreacted monomers. The solution was then diluted with additional dry toluene to form a solution containing about 10% by weight of copolymer. This solution was used in treating wool as described under Example 1. After a cycle of 5 washing and drying operations, and a final washing of 1 hour in the soap solution, the dried, treated piece of wool showed a shrinkage of 4.2%. After 15 washing and drying cycles, the shrinkage was 5.3%. The treated cloth had a soft feeling to the touch.

*Example 5*

| | Parts |
|---|---|
| Ethyl acrylate | 95.0 |
| Allyl isocyanate | 5.0 |
| Benzoyl peroxide | 0.4 |
| Toluene (dry) | 67.0 |

The same procedure was followed as described under Example 2 with the exception that the temperature of the bath was 140 to 145° C. The mixture of ethyl acrylate, allyl isocyanate and benzoyl peroxide was added dropwise to the toluene over a period of 40 minutes. Heating was continued under reflux for an additional period of 4 hours. Thereafter 250 parts of dry toluene was added to the mass, after which about 100 parts of solvent was distilled off at reduced pressure in order to remove any unreacted monomers. Two hundred and forty parts of the resulting solution was diluted with 460 parts of dry toluene to yield a solution containing about 10% by weight of copolymer. This solution was used in treating wool as described under Example 1. The shrinkage after a cycle of 5 washing and drying operations, and a final washing of 1 hour in the soap solution followed by drying, was 5.8%. After 15 washing and drying cycles, the shrinkage was 7.2%. The treated wool had a soft hand.

*Example 6*

| | Parts |
|---|---|
| Ethyl acrylate | 135.0 |
| Allyl isocyanate | 15.0 |
| Benzoyl peroxide | 0.6 |

Essentially the same procedure was followed as described under Example 1 with the exception that the ultraviolet lamp was mounted about 1 inch from the flask. After 24 hours' irradiation, a clear, firm mass of copolymer was obtained. One hundred parts of dry toluene was added to the copolymer composition, and after standing for about 6 days another 150 parts of toluene was added thereto. The solution was strained after standing for another 6 days in order to remove undissolved gel particles. The strained solution contained about 32% by weight of copolymer. One hundred parts of this solution was diluted with dry toluene to form a solution containing about 20% by weight of copolymer. This solution was emulsified by adding it slowly to an equal amount of water containing about 1% by weight of the sodium salt of the sulfate of a mixture of lauryl and myristyl alcohols, while violently agitating the mixture. This emulsion is later referred to herein as sample A. Another portion of the copolymer solution was diluted with an additional amount of toluene to yield a solution containing about 10% by weight of copolymer. This solution is later referred to herein as sample B.

Samples A and B were used in treating an organic fabric material, specifically wool, as described under Example 1. After a cycle of 5 washing and drying operations, and a final washing of 1 hour in the soap solution, the dried piece of wool which had been treated with sample A showed a shrinkage of 4.4%, while the wool which had been treated with sample B showed a shrinkage of 2.8%. After 15 washing and drying cycles, the shrinkage of the wool treated with sample A was 8.0% and that which had been treated with sample B, 4.2%. In both cases the treated woolen fabric had a soft hand.

*Example 7*

| | Parts |
|---|---|
| Acrylonitrile | 18.0 |
| Allyl isocyanate | 2.0 |
| Benzoyl peroxide | 0.08 |

The acrylonitrile and allyl isocyanate were mixed and added to a glass tube to which the benzoyl peroxide previously had been added. The mixture was blanketed with carbon dioxide, and the container was stoppered until ready for sealing. Thereafter it was cooled in dry ice and sealed while evacuating with a water pump, flushing out the container 4 or 5 times with carbon dioxide before sealing. The sealed container was allowed to stand for about 16 hours at room temperature, after which it was subjected to irradiation with ultraviolet light, using a Cooper-Hewitt lamp placed about 15 inches from the container. After about 5 minutes' irradiation, the solution started to become cloudy, apparently due to precipitation of the copolymer. The solution soon become opaque due to copolymer formation and had set to what appeared to be a solid mass before 8 hours had elapsed. After a total of 24 hours' exposure, irradiation was discontinued.

When the sealed glass tube was opened, the opaque, slightly discolored mass was found to consist of a shell of transparent polymerized material within which the bulk of the product was contained in an opaque, white form.

The copolymer composition of this example is suitable for use in preparing heat-resistant molding compounds which are capable of further cure.

*Example 8*

| | Parts |
|---|---|
| N-butyl acrylamide | 18.0 |
| Allyl isocyanate | 2.0 |
| Benzoyl peroxide | 0.08 |

The N-butyl acrylamide and allyl isocyanate were mixed together and added to a Pyrex glass vessel to which the catalyst previously had been added. The container was then sealed as described under Example 7. Although the catalyst dissolved only partly in the mixture of monomers, the mixture polymerised rapidly upon standing at room temperature. After about 96 hours the mixture had partly solidified. After standing for about 24 days the copolymer was obtained in the form of a clear, solid mass which swelled but did not dissolve in dioxane. This copolymer may be used, for example, in the production of molded articles. Since N-butyl acrylamide is a compound containing a hydrogen atom capable of reacting with the isocyanate grouping of the allyl isocyanate, this example illustrates the results that are obtained when such a material is copolymerized with a primary isocyanate of the kind with which this invention is concerned, specifically allyl isocyanate.

When N,N-dibutyl acrylamide is substituted for N-butyl acrylamide in the above formula, a copolymer is obtained which is soluble in various inert liquids, e. g., toluene, etc. Such soluble copolymers are suitable for use in treating organic fabric materials, e. g., cotton, wool, rayon, silk, etc., to impart improved properties therefore.

Example 9

| | Parts |
|---|---|
| Vinyl acetate | 18.0 |
| Allyl isocyanate | 2.0 |
| Benzoyl peroxide | 0.08 |

The same procedure was followed as described under Example 7. After 16 days' irradiation, a viscous, slightly discolored mass was obtained. After distilling off the unreacted monomers, a clear copolymer of vinyl acetate and allyl isocyanate resulted. This copolymer was moderately hard at room temperature.

A small portion of the polymer was dissolved in dioxane and the resulting solution was treated with a few drops of ethylene diamine. The mass gelled, showing the high degree of reactivity of the copolymer.

The copolymer of this example may be used, for example, in the preparation of coating compositions, as a modifier of other resinous materials, or alone or in combination with other resins it may be employed in the production of cast or molded articles.

Example 10

| | Parts |
|---|---|
| Ethyl acrylate | 40.0 |
| Allyl isocyanate | 10.0 |
| Benzoyl peroxide | 0.2 | were mixed together in a quartz flask and exposed to ultraviolet light under the same conditions as described under Example 1. After 65 hours the flask was rotated partly to expose a new surface to the light. Exposure was continued for a total of 161 hours, the ethyl acrylate and the allyl isocyanate having copolymerized at the end of this time to a clear, soft, sticky mass which had no appreciable flow.

Seventy-five parts of dry toluene was added to the flask and the copolymer was dissolved by first warming the mixture on a steam bath and then allowing it to stand at room temperature for about 3 days. An additional 25 parts of dry toluene was now added. A somewhat higher proportion of swollen but insoluble gelled polymer appeared to be present than was obtained in Example 1. The solution was strained to remove the gel particles, and the gel portion was then extracted with an additional 25 parts of dry toluene. One hundred and sixteen parts of solution containing 35 parts (approximately 30.1% by weight) of copolymer was obtained.

When a small portion of the above solution was treated with ethylene diamine, gelation occurred almost instantaneously. Similarly, when a small portion of the solution was treated with 2,2-dimethyl propanediol, although no reaction occurred immediately, heating in an oven at 100° C. for 10 to 15 minutes produced an insoluble, cross-linked copolymer.

Woolen goods were treated with a 10% solution of the copolymer as described under Example 1. The shrinkage after a cycle of 5 washing and drying operations and a final washing of 1 hour followed by drying was 4.2%. The treated wool had a soft hand.

It will be understood, of course, by those skilled in the art that our invention is not limited to the use of the specific ingredients named in the above illustrative examples nor to the particular proportions there shown. Thus, instead of allyl isocyanate we may use, for instance, methallyl isocyanate, 3-butenyl isocyanate, p-vinylbenzyl isocyanate or any other primary isocyanate or mixture thereof embraced by the general formula $CH_2=CR-(A)_n-CH_2-NCO$ where R, A and $n$ have the meanings given in the second paragraph of this specification, numerous examples of which isocyanates were hereinbefore given.

Likewise, monomeric materials other than those specified in the examples may be copolymerized with the primary isocyanate. For example, we may use methyl acrylate, propyl acrylate, hexyl acrylate, methyl methacrylate, ethyl methacrylate, allyl acetate, methacrylonitrile or any other compound which is copolymerizable with the isocyanate, which contains a single

grouping and which is free from a hydrogen atom or atoms reactive with the isocyanate grouping, numerous examples of which compounds previously have been given. If desired, mixtures of monomers may be copolymerized with a single isocyanate or with a plurality of isocyanates.

Catalysts other than benzoyl peroxide also may be employed, but if a catalyst is used it is desirable to use one which contains no hydrogen atom or atoms that will react with the isocyanate grouping. Examples of catalysts that may be employed are inorganic peroxides such, for example, as barium peroxide, etc.; dialkyl peroxides, e. g., lauryl peroxide, stearyl peroxide, di-(tertiary-butyl) peroxide, etc.; symmetrical diacyl peroxides, e. g., acetyl peroxide, lauroyl peroxide, stearoyl peroxide, etc.; unsymmetrical or mixed diacyl peroxides, e. g., acetyl benzoyl peroxide, etc. Any suitable amount of catalyst may be used, but in general the catalyst concentration will be within the range of about 0.05 to 2 or 3% by weight of the mixed copolymerizable materials.

The proportions of the copolymerizable ingredients may be varied over a wide range, but in all cases the proportions are such that the resulting polymerization product has an average of at least two isocyanate groupings per molecule. Particularly useful copolymer compositions are obtained when the mixture of copolymerizable materials contains, by weight, from about 3 to 30% of the primary isocyanate and from about 97 to 70% of the other copolymerizable monomer. In producing soluble copolymers for use in treating wool and other textile materials, we prefer to use a mixture of, by weight, about 5 to 15% of the primary isocyanate and about 95 to 85% of the other copolymerizable monomer. When the copolymer is used in such applications no particular advantage ordinarily accrues when the isocyanate is used in an amount much above about 15%, by weight, of the mixed ingredients. Good results have been obtained with copolymers produced from a mixture of, by weight, about 10% of the primary isocyanate and about 90% of the other copolymerizable monomer. For some applications it may be desirable to use the isocyanate in an amount substantially exceeding 30%, by weight, of the mixed ingredients, but in general the isocyanate will constitute a lesser or minor proportion and the other monomeric material a greater or major proportion, by weight, of the mixed copolymerizable materials.

The copolymer compositions of this invention have a wide variety of commercial applications due to the fact that they will react with any compound or material containing an active hydrogen atom. In addition to their use in treating cotton, rayon, silk, wool, and other textile materials, they also may be employed for treating paper, leather, resin-coated surfaces, etc. They also may be used in treating dyes prior to dyeing a fabric material or they may be employed to finish dyed fabrics. Because of the reactive nature of these copolymers they also have application in anchoring fire-proofing and rain-proofing agents on fabric and other materials. In a similar manner, they may be employed for the purpose of anchoring dyes in fabrics. In coating compositions the isocyanate copolymers of this invention may be used directly to secure cured films, the water vapor present in the air ordinarily being sufficient to accelerate cross-linking.

The hardenable or potentially hardenable copolymers of this invention may be used alone or with fillers, dyes, pigments, opacifiers, etc., in a wide variety of casting, molding and laminating applications, as adhesives, impregnants, and surface-coating materials and for numerous other purposes. Thus they may be employed, for instance, in protectively coating surfaces of metal, wood, synthetic resins, etc., or as a finish coating over painted surfaces.

These new copolymers may be modified by the addition of other reactive or non-reactive materials, or they themselves may be used as modifiers of other substances which are reactive or non-reactive with the copolymer. Illustrative examples of materials with which the reactive copolymers of this invention may be combined are compounds or substances containing one or more —OH groups, for instance: glycol, glycerine and other polyhydric alcohols; fatty oils of the kind exemplified by castor oil; diglycerides; alkyd resins containing —OH groups; urea-formaldehyde condensation products, e. g., mono- and dimethylol ureas and their partial condensation products; acetylene urea; melamine-formaldehyde condensation products, e. g., mono-, di-, tri-, tetra-, penta- and hexa-methylol melamines and their partial condensation products; phenol-formaldehyde condensation products, e. g., saligenin and the more highly condensed phenol alcohols; polyvinyl phenols; sugars; starches; polyvinyl alcohol and partially esterified and etherified polyvinyl alcohols; polyallyl and polymethallyl alcohols and partially esterified and etherfied polyallyl and polymethallyl alcohols; cellulose and cellulose derivatives containing free hydroxyl groups, e. g., partially esterified cellulose, partially etherified cellulose, etc.; partially or wholly methylolated acrylamides; water-soluble natural gums, e. g., agar agar, tragacanth, pectin, etc.; silicols and their partial condensation products, e. g., mono-, di- and tri-methyl silicols and mixtures thereof, mono-, di- and triphenyl silicols and mixtures thereof, mixtures of any or all of the aforementioned methyl and phenyl silicols, and partial condensation products of the aforementioned silicols and mixtures thereof.

Our new copolymers also may be combined with nitrogen-containing materials, e. g., ethylene imine, ethylene diamine, diethylene triamine, gelatin, chitin, monoamino and polyamino compounds such, for instance, as wool, silk, zein, casein, regenerated fibers from soyabean, casein, collagen, etc., to yield new and useful materials or articles of manufacture.

The copolymers of this invention are especially valuable for use in the preparation of laminated and molded articles. Thus, they may be employed in treating sheet materials, e. g., paper, fabric materials of cotton, linen, asbestos, etc., which, with or without subsequent treatment with other resinous materials, e. g., melamine-aldehyde resins, urea-aldehyde resins, alkyd resins, etc., are thereafter dried, superimposed and laminated under heat and pressure to yield laminated articles wherein the copolymer has become an integral part of the sheet material. They also may be used advantageously in bonding together wood flour, alpha-cellulose and other finely divided fillers to form molded articles of manufacture. In the case of those fillers that contain a hydrogen atom or atoms reactive with the isocyanate grouping, the copolymer reacts therewith to yield a product in which the copolymer is chemically bound therein. Finely divided fillers also may be pretreated with these new copolymers prior to incorporation in conventional molding compositions, e. g., phenol-formaldehyde, urea-formaldehyde, melamine-formaldehyde, etc., molding compositions. Or, the filler combined with phenol-formaldehyde, urea-formaldehyde or other synthetic resin may be treated with these new copolymers in the preparation of the molding composition.

The process of treating organic textile, hydrogen-donor materials with the reactive polymerization products of this invention and the products of such treatment are claimed in our copending application Serial No. 694,157, filed concurrently herewith, now Patent No. 2,537,064, dated January 9, 1951.

What we claim as new and desire to secure by Letters Patent of the United States is:

1. A polymerizable composition comprising a mixture of, by weight, a minor proportion of (1) a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and a major proportion of (2) a different organic compound which is copolymerizable with the isocyanate of (1), which contains a single $$CH_2=C\diagup$$

grouping, and which is free from a hydrogen atom reactive with the isocyanate grouping, the aforementioned proportions of the said ingredients of (1) and (2) in the said mixture being such that the resulting polymerization product has an average of at least two isocyanate groupings per molecule.

2. A composition comprising the product of polymerization of a polymerizable mixture including, by weight, a minor proportion of (1) a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and a major proportion of (2) a different organic compound which is copolymerizable with the isocyanate of (1), which contains a single

grouping, and which is free from a hydrogen atom reactive with the isocyanate grouping, the aforementioned proportions of the said ingredients of (1) and (2) in the said mixture being such that the said polymerization product has an average of at least two isocyanate groupings per molecule.

3. A copolymer as in claim 2 wherein the isocyanate of (1) is allyl isocyanate.

4. A copolymer which is soluble in inert organic liquids, said copolymer being the product of polymerization of a mixture containing, by weight, (1) from about 3 to 30% of a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (2) from about 97 to 70% of an acrylamide containing a single

grouping and which is free from a hydrogen atom reactive with the isocyanate grouping, said ingredients of (1) and (2) being copolymerizable.

5. A copolymer as in claim 4 wherein the acrylamide of (2) is N,N-dibutyl acrylamide.

6. A copolymer which is soluble in inert organic liquids, said copolymer being the product of polymerization of a mixture containing, by weight, (1) from about 3 to 30% of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (2) from about 97 to 70% of an acrylic ester containing a single

grouping, and which is free from a hydrogen atom reactive with the isocyanate grouping, said ingredients of (1) and (2) being copolymerizable.

7. A copolymer as in claim 6 wherein the acrylic ester of (2) is ethyl acrylate.

8. A copolymer which is soluble in inert organic liquids, said copolymer being the product of polymerization of a mixture containing, by weight, (1) from about 3 to 30% of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (2) from about 97 to 70% of a vinyl ester containing a single

grouping, and which is free from a hydrogen atom reactive with the isocyanate grouping, said ingredients of (1) and (2) being copolymerizable.

9. A copolymer as in claim 8 wherein the vinyl ester of (2) is vinyl acetate.

10. A liquid composition comprising (1) a soluble copolymer which is the product of polymerization of a mixture containing, by weight, (a) from about 3 to 30% of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (b) from about 97 to 70% of an acrylic compound containing a single

grouping and which is free from a hydrogen atom reactive with the isocyanate grouping, said ingredients of (a) and (b) being copolymerizable, and (2) a liquid which will dissolve said copolymer and which is inert thereto.

11. A toluene-soluble copolymer of, by weight, a minor proportion of allyl isocyanate and a major proportion of N,N-dibutyl acrylamide, said copolymer having an average of at least two isocyanate groupings per molecule.

12. A toluene-soluble copolymer of, by weight, a minor proportion of allyl isocyanate and a major proportion of ethyl acrylate, said copolymer having an average of at least two isocyanate groupings per molecule.

13. A toluene-soluble copolymer of, by weight, a minor proportion of allyl isocyanate and a major proportion of vinyl acetate, said copolymer having an average of at least two isocyanate groupings per molecule.

14. A composition comprising the product of polymerization of a mixture of, by weight, from about 3 to 30% of allyl isocyanate and from 97 to 70% of an N,N-dialkyl acrylamide.

15. A composition comprising the product of polymerization of a mixture of, by weight, from about 3 to 30% of allyl isocyanate and from about 97 to 70% of an acrylic ester of a saturated aliphatic monohydric alcohol.

16. A composition comprising the product of polymerization of a mixture of, by weight, from about 3 to 30% of allyl isocyanate and from about 97 to 70% of a vinyl ester of a saturated aliphatic monocarboxylic acid.

17. The method of preparing new synthetic compositions which comprises polymerizing under anhydrous conditions a mixture containing, by weight, a minor proportion of (1) a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value selected from the class consisting of 0 and 1, the methylene radical attached to the isocyanate grouping being attached directly, when n is 1, to any carbon atom of the divalent radical represented by A, and a major proportion of (2) a different organic compound which is copolymerizable with the isocyanate of (1), which contains a single

grouping and which is free from a hydrogen atom reactive with the isocyanate grouping, the aforementioned proportions of the said ingredients of (1) and (2) in the said mixture being such that the resulting polymerization product has an average of at least two isocyanate groupings per molecule.

18. A substance comprising the product of reaction of (1) a product of polymerization of a polymerizable mixture including, by weight, a minor proportion of (a) a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value selected from the class consisting of 0 and 1, the methylene radical attached to the isocyanate grouping being attached directly, when n is 1, to any carbon atom of the divalent radical represented by A, and a major proportion of (b) a different organic compound which is copolymerizable with the isocyanate of (a), which contains a single

grouping, and which is free from a hydrogen atom reactive with the isocyanate grouping, the aforementioned proportions of the said ingredients of (a) and (b) being such that the said polymerization product has an average of at least two isocyanate groupings per molecule, and (2) a compound containing a hydrogen atom which is reactive with the isocyanate groupings present in the polymerization product of (1).

19. A composition comprising the product of polymerization of a polymerizable mixture including allyl isocyanate and ethyl acrylate, the allyl isocyanate constituting, by weight, from about 3% to about 30% and the ethyl acrylate constituting from about 97% to about 70% of the said polymerizable mixture.

20. A composition containing, as an essential reactive ingredient, a reactive copolymer of about 90 to 95% by weight of ethyl acrylate and about 5 to 10% by weight of allyl isocyanate.

21. The method of producing a composition comprising a reactive copolymer of ethyl acrylate and allyl isocyanate which comprises preparing a mixture of, by weight, 45 parts of ethyl acrylate, 5 parts of allyl isocyanate and 0.2 part of benzoyl peroxide, copolymerizing the ethyl acrylate and allyl isocyanate components of the said mixture under the influence of ultraviolet light while admixed with the said benzoyl peroxide and while passing a slow stream of dry carbon dioxide through the reaction mass during the course of the copolymerization reaction, and continuing the copolymerization reaction under the aforementioned conditions until there has been obtained a reactive copolymer characterized by the fact that most of it is soluble in dry toluene.

22. The method of producing a toluene solution of a reactive copolymer of ethyl acrylate and allyl isocyanate which comprises preparing a mixture of, by weight, 95 parts of ethyl acrylate, 5 parts of allyl isocyanate and 0.4 part of benzoyl peroxide, adding said mixture slowly to a mass of dry toluene, heating the resulting mixture under reflux for a period of the order of 4 hours after the addition of all of the said mixture to the said toluene, thereafter adding a further amount of dry toluene to the mass, and distilling off a portion of the added toluene under reduced pressure concurrently with the removal of any unreacted monomers.

EDWARD L. KROPA.
ARTHUR S. NYQUIST.

REFERENCES CITED

The following references are of record in the file of this patent:

UNITED STATES PATENTS

| Number | Name | Date |
|---|---|---|
| 2,326,287 | Coffman | Aug. 10, 1943 |
| 2,335,582 | Coffman | Nov. 30, 1943 |

OTHER REFERENCES

Beilstein, "Organische Chemie," vol. 4, page 214.